(12) United States Patent
Nogami

(10) Patent No.: US 7,130,260 B2
(45) Date of Patent: Oct. 31, 2006

(54) APPARATUS FOR FIXING A HALF MIRROR OF AN OPTICAL PICKUP AND OPTICAL PICKUP

(75) Inventor: Toyoshi Nogami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 542 days.

(21) Appl. No.: 10/270,565

(22) Filed: Oct. 16, 2002

(65) Prior Publication Data

US 2003/0086355 A1    May 8, 2003

(30) Foreign Application Priority Data

Nov. 6, 2001    (JP) ............................. P2001-340103

(51) Int. Cl.
G11B 7/135    (2006.01)

(52) U.S. Cl. ................................. 369/112.29

(58) Field of Classification Search .................. None
See application file for complete search history.

(56) References Cited

U.S. PATENT DOCUMENTS 6,023,448 A * 2/2000 Tajiri et al. ............ 369/112.04
6,478,411 B1 * 11/2002 Kitahara ....................... 347/70
6,715,935 B1 * 4/2004 Mori et al. .................... 385/88

FOREIGN PATENT DOCUMENTS

JP         8-111027        4/1996

* cited by examiner

Primary Examiner—Thang V. Tran
Assistant Examiner—Michael V. Battaglia
(74) Attorney, Agent, or Firm—Morgan, Lewis & Bockius LLP

(57) ABSTRACT

An optical pickup in which a substantially L-shaped retaining seat having an inclined side surface and an inclined end surface which are orthogonal to each other is formed on one side surface of a light passage hole formed in a housing, a groove is formed between the inclined side surface and the inclined end surface, while a positioning seat is formed on the other side surface of the light passage hole. An adhesive agent is injected between each of both end portions of a half mirror, which is disposed in an inclined state on the both seats, and each of the seats and into the groove. The width of an opening portion of the groove is set to be larger than the width of an depth portion of the groove.

5 Claims, 11 Drawing Sheets

PRIOR ART FIG.10

APPARATUS FOR FIXING A HALF MIRROR OF AN OPTICAL PICKUP AND OPTICAL PICKUP

BACKGROUND OF THE INVENTION

1. Field of the Invention

The present invention relates to an apparatus for fixing a half mirror of an optical pickup for use in a disk player such as a DVD or a CD, which makes it possible to reliably fix a half mirror of an optical pickup to a housing.

2. Description of the Related Art

FIG. 8 shows an example of an optical pickup. This optical pickup has a half mirror HM disposed in an inclined state at midway in a light passage hole 2 formed in a housing 1. An objective lens OL and a collimator lens QWP, on the one hand, and a support member 4 with a photodiode PD, on the other hand, are respectively disposed at both ends of the housing 1 with the half mirror HM placed therebetween. Further, a semiconductor laser LD is provided on a side surface of the housing 1. A laser light is projected from the semiconductor laser LD onto a disk D such as a DVD or a CD through the half mirror HM, the collimator lens QWP and the objective lens OL, and the reflected light is received by the photodiode PD so as to read information recorded on the disk D.

As shown in FIGS. 9 to 11, a substantially L-shaped retaining seat 6 having an inclined side surface 6a and an inclined end surface 6b opposing orthogonal to each other is formed on one side surface 2a of the light passage hole 2. Further, a U-groove 7 is formed between the inclined side surface 6a and the inclined end surface 6b. A positioning seat 8 having an inclined side surface 8a flush with the inclined side surface 6a of the retaining seat 6 is formed on the other side surface 2b of the light passage hole 2.

As shown in FIGS. 9 to 11, the half mirror HM has the shape of a rectangular block, and is disposed so as to diagonally traverse the light passage hole 2 by causing its rear surface to abut against an end surface 2c of the light passage hole 2, its one end portion to abut against the inclined side surface 6a and the inclined end surface 6b of the retaining seat 6, and its other end portion to abut against the inclined side surface 8a of the positioning seat 8.

A technique for fixing the half mirror HM disclosed JP-A-8-111027 will be described with reference to FIGS. 9 to 11. In this technique, an ultraviolet curing adhesive agent 10 is injected by an injector 9 into three spots between the half mirror HM and the retaining seat 6, and between the half mirror HM and the positioning seat 8. Also, the adhesive agent 10 is injected by an injector 9 into the U-groove 7. Ultraviolet rays are then applied to the adhesive agent 10 to cure, thereby fixing the half mirror HM so as not to move unexpectedly in the left-and-right directions a and b, back-and-forth directions c and d, and vertical directions e and f.

With the above-described conventional structure, since the width t and the height h of the U-groove 7 are set to be 0.5 mm to 1 mm for example, and U-groove's opening area is small, there is a possibility that the adhesive agent 10 fails to be injected sufficiently into the U-groove 7 and flows out to the outside if the ultraviolet curing adhesive agent 10 is injected into the U-groove 7 at a time. In such case, the adhesive agent 10 is injected into the opening portion of the U-groove 7 only by an interval α, thereby rendering the fixation of the half mirror HM by the adhesive agent 10 unreliable.

Accordingly, it is conceivable to enlarge the width t and the height h of the U-groove 7. However, this may cause the ultraviolet curing adhesive agent 10 to be accumulated in the U-groove 7 in a relatively large quantity, and the half mirror HM may possibly be displaced from its predetermined position by being pulled by the shrinking force due to the curing of the adhesive agent accumulated therein.

SUMMARY OF THE INVENTION

An object of the present invention is to provide an optical pickup which makes it possible to reliably fix a half mirror at a predetermined position on a housing in a simple arrangement.

According to a first aspect of the present invention, there is provided an apparatus for fixing a half mirror of an optical pickup, comprising: a retaining seat having an inclined side surface and an inclined end surface which are orthogonal to each other, the retaining seat is formed on one side surface of a light passage hole formed in a housing; a groove formed between the inclined side surface and the inclined end surface; and a positioning seat having an inclined side surface flush with the inclined side surface of the retaining seat, the positioning seat is formed on another side surface of the light passage hole, wherein both end portions of the half mirror are disposed on the retaining seat and the positioning seat respectively whereby the half mirror is positioned in an inclined state, wherein an adhesive agent is injected between each of the both end portions of the half mirror and each of the seats and into the groove, and wherein one side surface of the groove is formed in an arcuate shape whereby a width of a central portion of the groove is narrow and widths of both ends of the groove are wide.

According to the above structure, since the width of the end of the groove is set to be wide, the adhesive agent such as ultraviolet curing adhesive agent or heat curing adhesive agent in a quantity substantially corresponding to the volume of the groove is injected into the groove smoothly up to the depth portion along the arcuate side surface of the groove without overflowing to the outside. In addition, the width of the central portion of the groove is set to be narrow, while the widths of the opening end and the depth end of the groove are respectively set to be wide. Since the overall volume of the groove is not much different from the volume of the conventional groove, the adhesive agent in an appropriate quantity is accumulated in the groove. Also, since the adhesive agent is injected symmetrically in the groove with its central portion serving as a boundary, the shrinkage force at the time when the adhesive agent is solidified is applied substantially uniformly to the half mirror, thereby making it possible to reliably fix the half mirror at a predetermined position.

According to a second aspect of the present invention, there is provided an apparatus for fixing a half mirror of an optical pickup, comprising: a retaining seat having an inclined side surface and an inclined end surface which are orthogonal to each other, the retaining seat is formed on one side surface of a light passage hole formed in a housing; a groove formed between the inclined side surface and the inclined end surface; and a positioning seat having an inclined side surface flush with the inclined side surface of the retaining seat, the positioning seat is formed on another side surface of the light passage hole, wherein both end portions of the half mirror are disposed on the retaining seat and the positioning seat respectively whereby the half mirror is positioned in an inclined state, wherein an adhesive agent is injected between each of the both end portions of the half mirror and each of the seats and into the groove, and wherein one end of the groove from which the adhesive agent is injected has an expanded width.

According to the above structure, since the opening portion of the groove is outwardly expanded, the adhesive agent such as ultraviolet curing adhesive agent or heat curing adhesive agent is injected smoothly from the expanded opening portion up to the depth portion of the groove without overflowing to the outside. In addition, since the opening portion of the groove is expanded and the overall volume of the groove is not much different from the volume of the conventional groove, the adhesive agent in an appropriate quantity is accumulated in that groove and the half mirror is reliably fixed at a predetermined position.

According to a third aspect of the present invention, one end of the groove has a wide width compared with another end of the groove.

According to the above structure, since one end of the groove has a wide width compared with another end of the groove, the adhesive agent such as ultraviolet curing adhesive agent or heat curing adhesive agent is injected smoothly from the expanded opening portion up to the depth portion of the groove without overflowing to the outside. In addition, since the opening portion of the groove is expanded and the overall volume of the groove is not much different from the volume of the conventional groove, the adhesive agent in an appropriate quantity is accumulated in that groove and the half mirror is reliably fixed at a predetermined position.

According to a fourth aspect of the present invention, at least one side surface of the groove is inclined with respect to a direction along which the groove extend so as to expand the width of the groove.

According to the above structure, since at least one side surface of the groove is inclined with respect to a direction along which the groove extend so as to expand the width of the groove, the adhesive agent such as ultraviolet curing adhesive agent or heat curing adhesive agent is injected smoothly from that outwardly expanded opening portion up to the depth portion of the groove along the inclined side surface without overflowing to the outside. In addition, although the opening portion of the groove is expanded, the overall volume of the groove is not much different from the volume of the conventional groove. Thus, the adhesive agent in an appropriate quantity is accumulated in the groove, and the half mirror is reliably fixed at a predetermined position.

According to a fifth aspect of the present invention, at least one side surface of the groove is formed in an arcuate shape whereby a width of a central portion of the groove is narrow and widths of both ends of the groove are wide.

According to the above structure, since the width of the opening end of the groove is set to be wide, the adhesive agent such as ultraviolet curing adhesive agent or heat curing adhesive agent is injected smoothly from that widely set opening portion up to the depth portion along the arcuate side surface of the groove without overflowing to the outside. In addition, the width of the central portion of the groove is set to be narrow, while the widths of the opening end and the depth end of the groove are respectively set to be wide. Therefore, the overall volume of the groove is not much different from the volume of the conventional groove, thereby the adhesive agent in an appropriate quantity is accumulated in the groove. Also, since the adhesive agent is injected symmetrically in the groove with its central portion serving as a boundary and the shrinkage force at the time when the adhesive agent is solidified is applied substantially uniformly to the half mirror, it is possible to reliably fix the half mirror at a predetermined position.

DETAILED DESCRIPTION OF THE PREFFERED EMBODIMENTS

Figure 1:
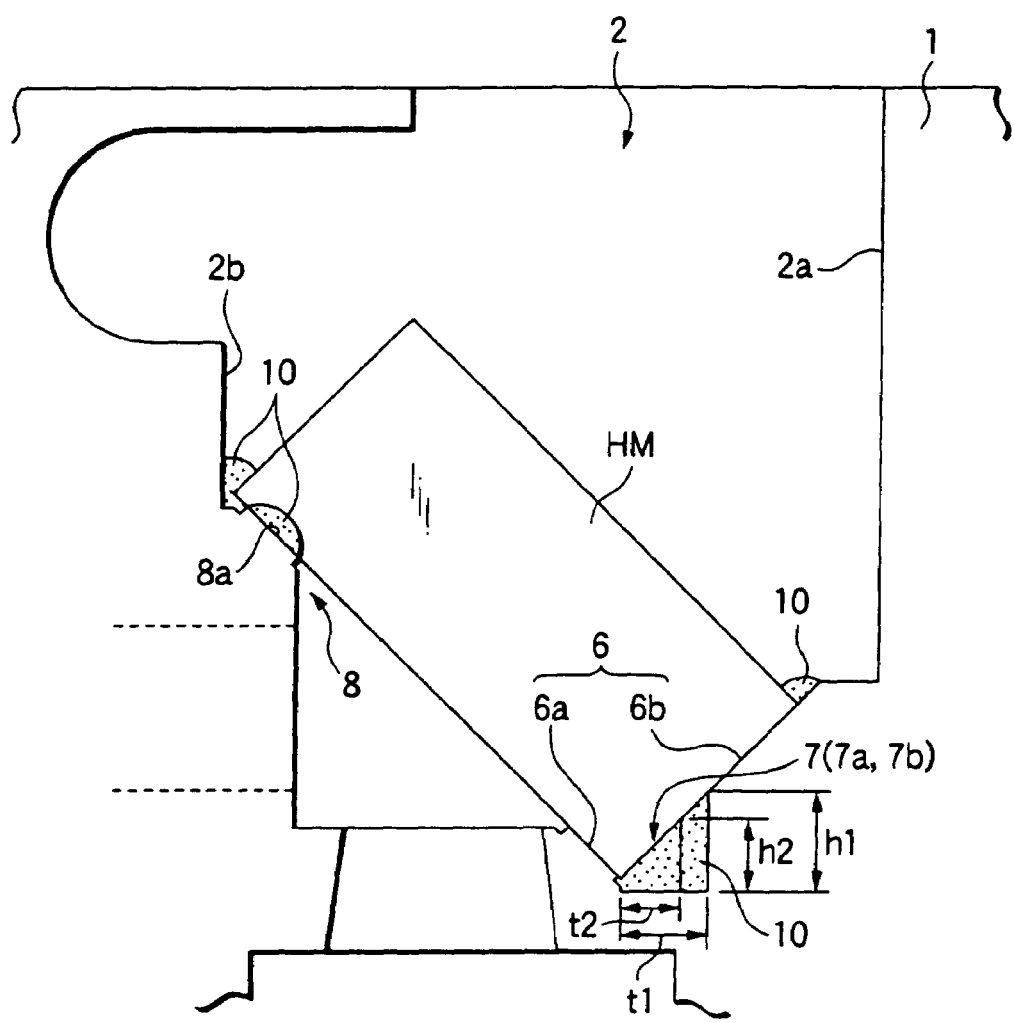
FIG. 1 is a front elevational view of an apparatus for fixing a half mirror of an optical pickup in accordance with a first embodiment of the invention.
Figure 2:
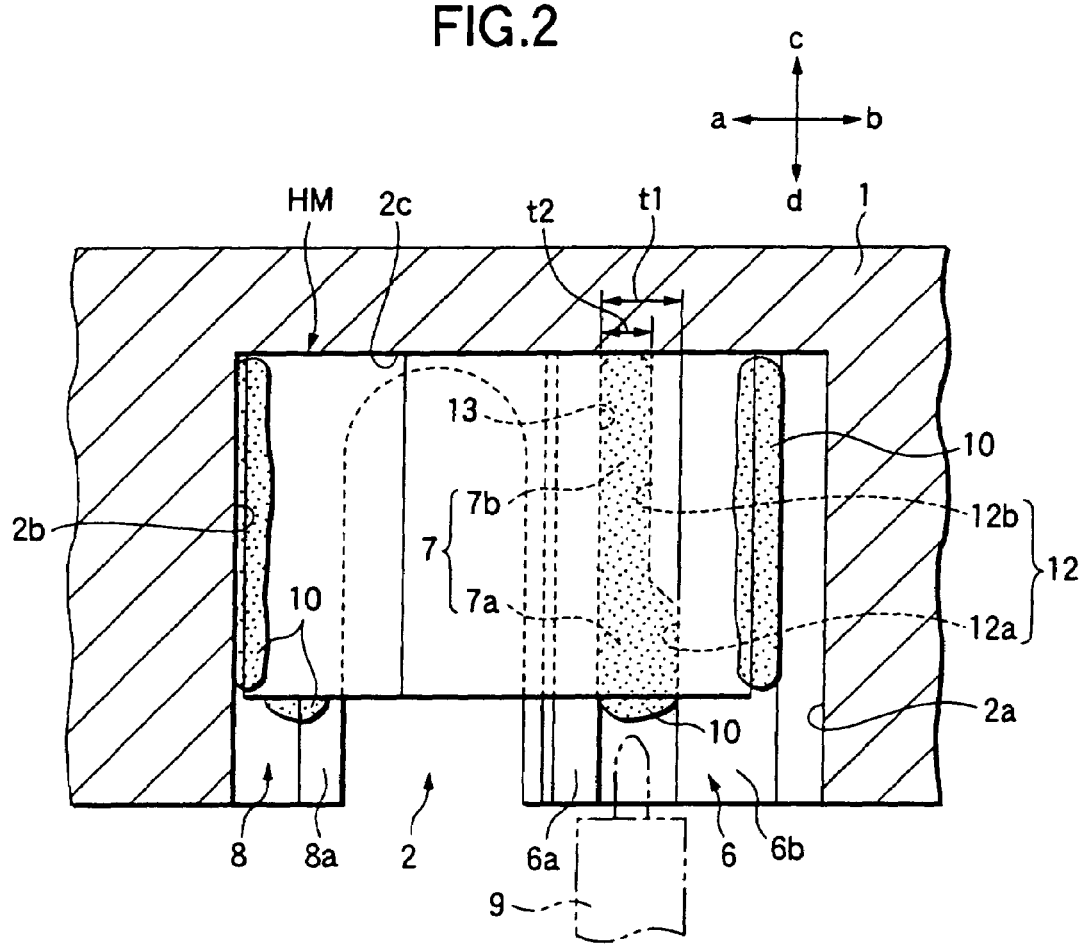
FIG. 2 is a horizontal sectional view of the first embodiment.
Figure 3:
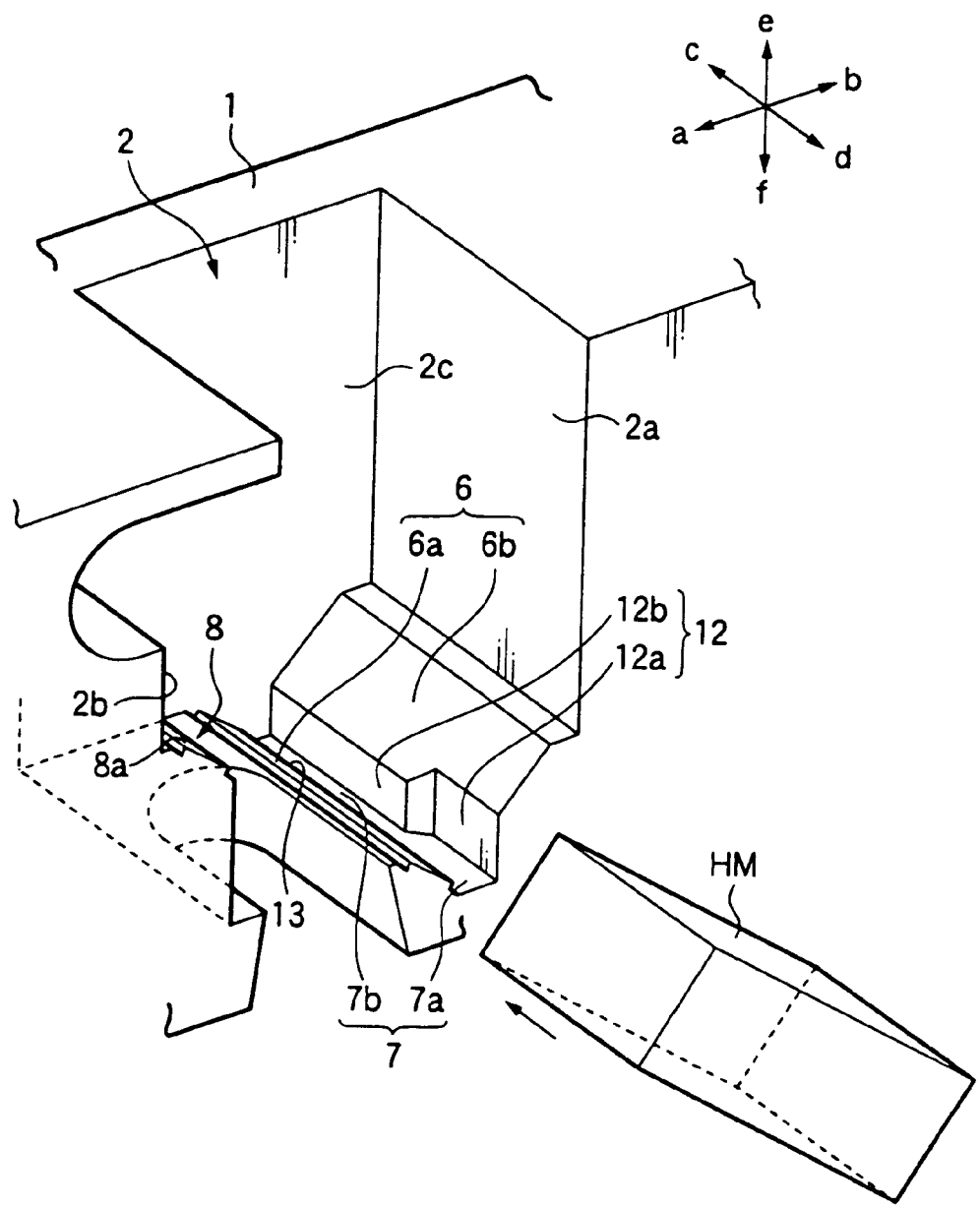
FIG. 3 is an exploded perspective view of the first embodiment.
Figure 9:
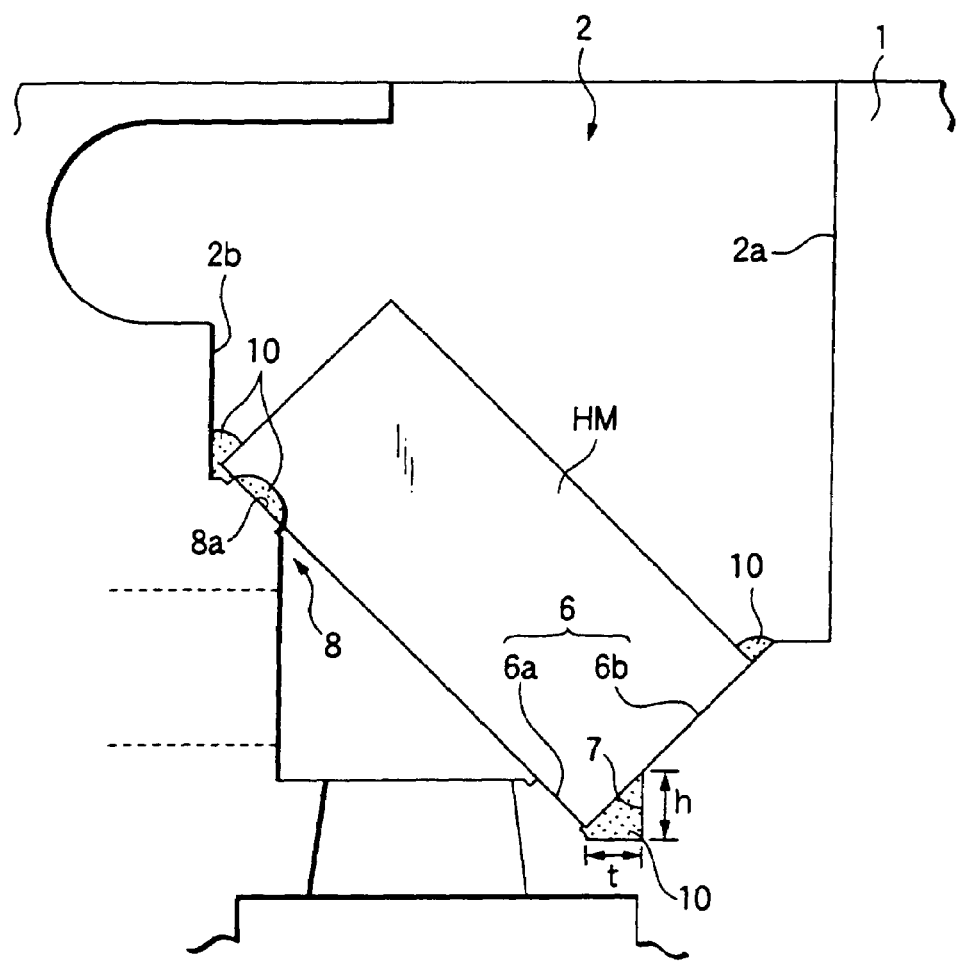
FIG. 9 is a front elevational view illustrating a conventional art.
Figure 10:
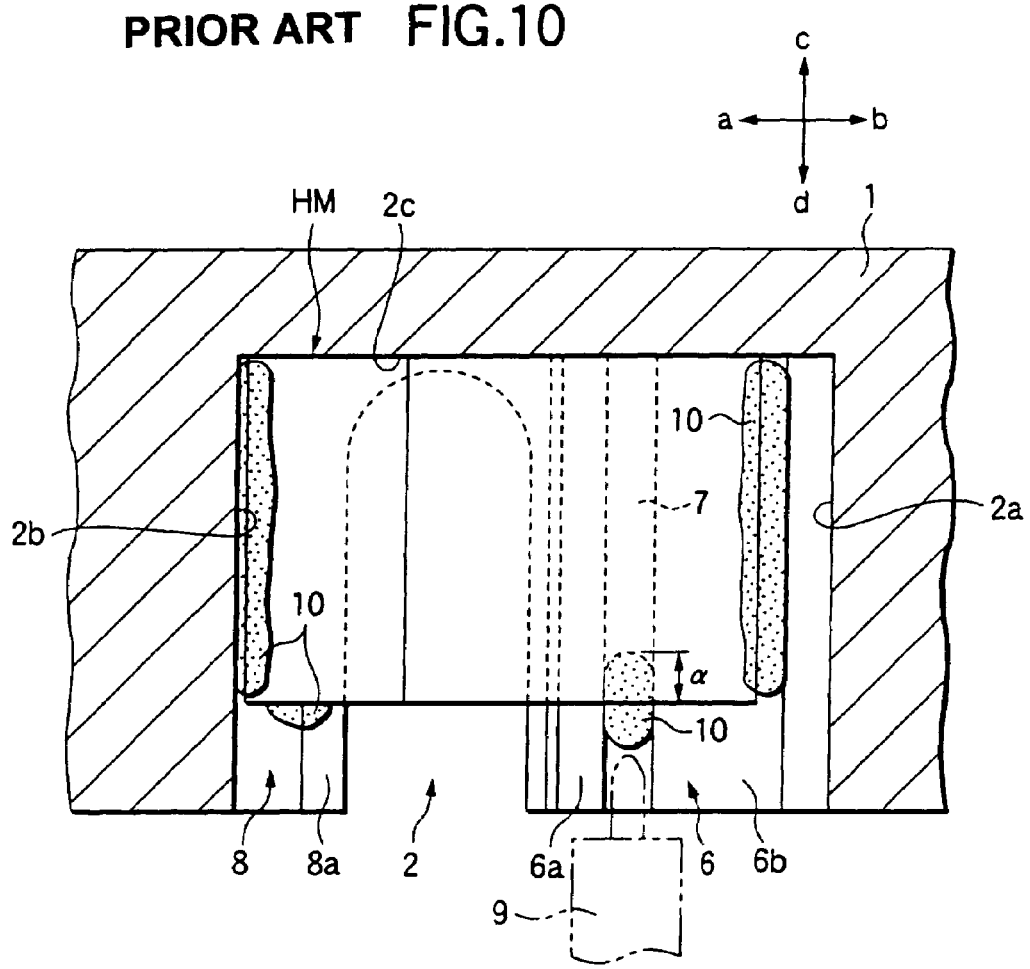
FIG. 10 is a horizontal sectional view of the conventional art.
Figure 11:
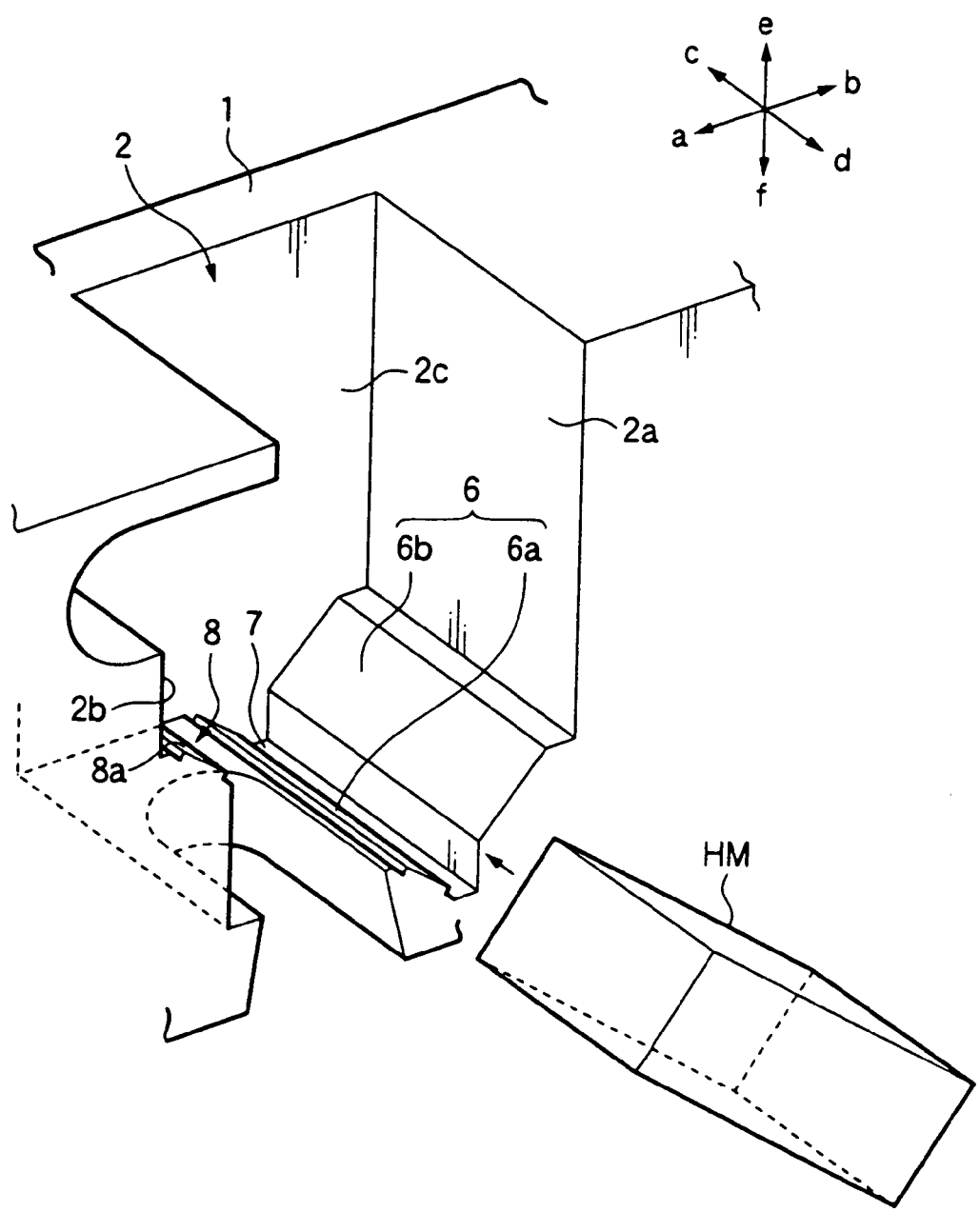
FIG. 11 is an exploded perspective view of the conventional art.

FIGS. 1 to 3 show an apparatus for fixing a half mirror of an optical pickup in accordance with a first embodiment of the invention. A U-groove 70f is defined between side surfaces 12 and 13. The side surface 13 is formed linearly in the conventional manner. The side surface 12 has a side surface portion 12a on an opening portion 7a of the U-groove 7. The side surface portion 12a is laterally wider than a side surface portion 12b on a depth portion 7b of the U-groove 7. The width t2 and the height h2 of the depth portion 7b are set to be 0.5 mm to 1 mm, whereas the width t1 and the height h1 of the opening portion 7a are made larger than the conventional dimensions by being set to be, for example, 0.7 mm to 1.2 mm. Since the arrangements other than those described above are substantially the same as those shown in FIGS. 9 to 11, identical portions will be denoted by the same reference numerals, and a description thereof will be omitted.

A procedure of fixing a half mirror HM will be described. The half mirror HM is disposed so as to diagonally traverse the light passage hole 2 by causing the rear surface of the half mirror HM to abut against an end surface 2c of a light passage hole 2, its one end portion to abut against an inclined side surface 6a and an inclined end surface 6b of a retaining seat 6, and its other end portion to abut against an inclined side surface 8a of a positioning seat 8. Then, a heat curing adhesive or an ultraviolet curing adhesive agent 10 is injected by an injector 9 into three spots between the half mirror HM, on the one hand, and the retaining seat 6 and the positioning seat 8, on the other hand. Further, the ultraviolet curing adhesive agent 10 in a quantity substantially corresponding to the volume of the U-groove 7 is injected into the U-groove 7. Ultraviolet rays are then applied to the adhesive agent 10 to cure, thereby fixing the half mirror HM so as not to move unexpectedly in the left-and-right directions a and b, back-and-forth directions c and d, and vertical directions e and f.

According to the above-described structure, since the width t1 and the height h1 of the opening portion 7a of the U-groove 7 are set to be large, and the ultraviolet curing adhesive agent 10 in a quantity substantially corresponding to the volume of the U-groove 7 is injected into the U-groove 7 in a plurality of injections, the adhesive agent 10 is injected smoothly up to the depth portion 7b along the side surfaces 12 and 13 of the U-groove 7 without overflowing to the outside. In addition, since the opening portion 7a of the U-groove 7 is expanded and the overall volume of the U-groove 7 is not much different from the volume of the conventional U-groove, the adhesive agent 10 in an appropriate quantity is accumulated in the U-groove 7, thereby the half mirror HM is reliably fixed at a predetermined position.

Figure 4:
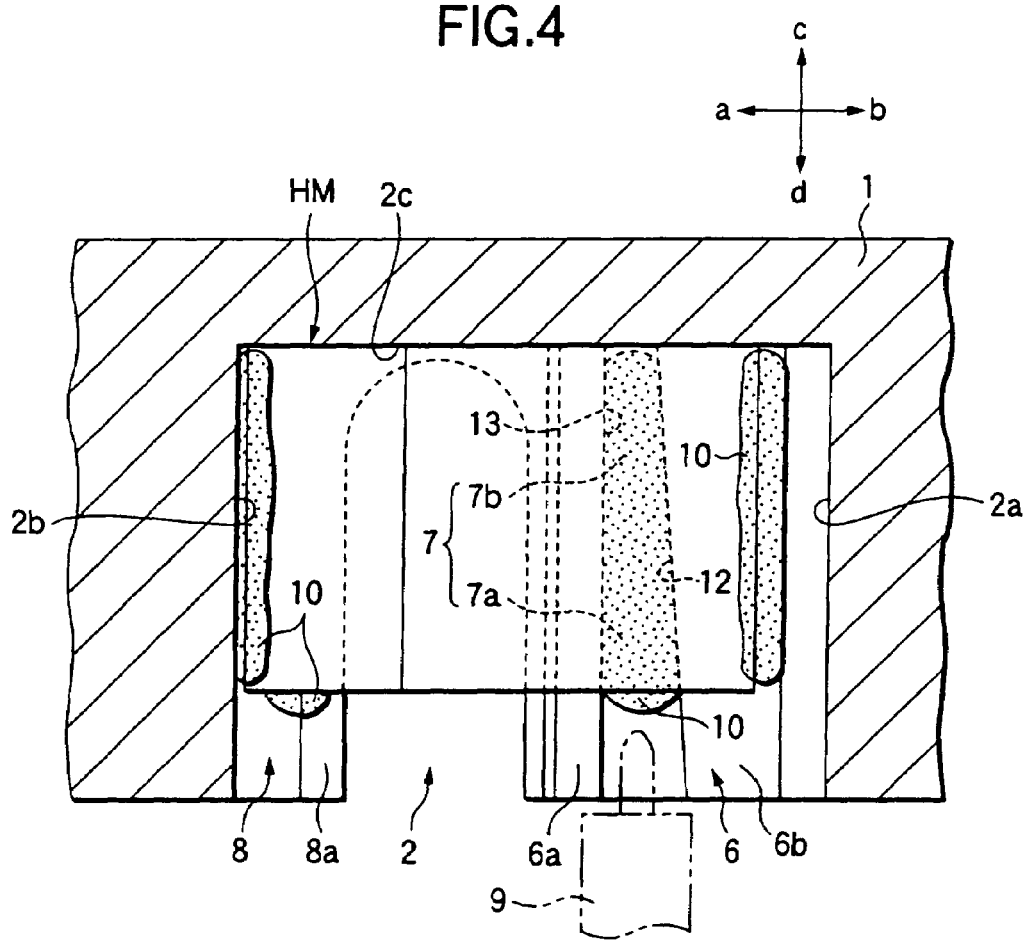
FIG. 4 is a horizontal sectional view of an apparatus for fixing a half mirror of an optical pickup in accordance with a second embodiment of the invention.
Figure 5:
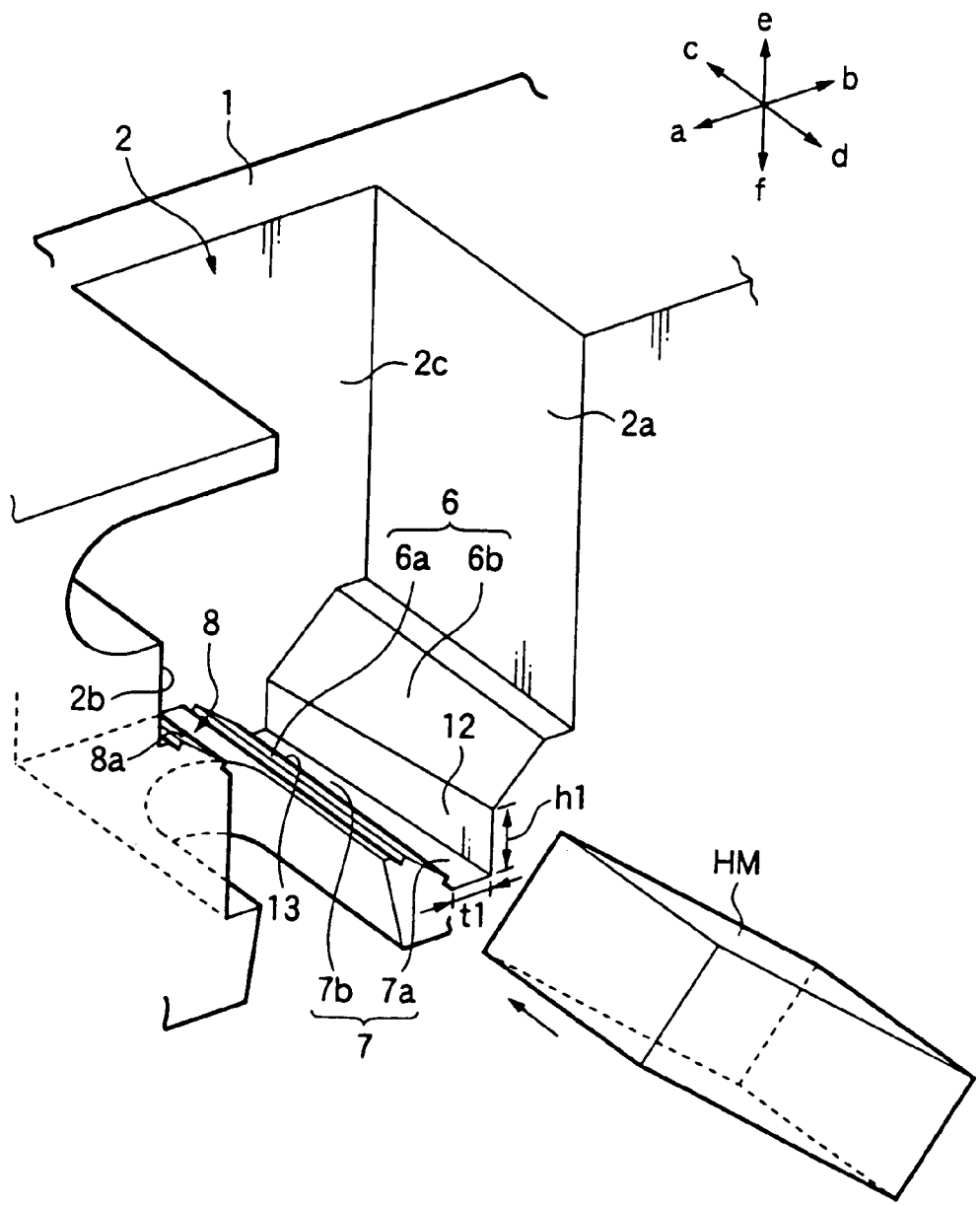
FIG. 5 is an exploded perspective view of the second embodiment.

FIGS. 4 and 5 show an apparatus for fixing a half mirror of an optical pickup in accordance with a second embodiment of the invention. A U-groove 7 is defined between side surfaces 12 and 13. The side surface 13 is formed ilinearly in the conventional manner, while the side surface 12 is inclined in an outwardly expanding manner. The width t1 and the height h1 of the opening portion 7a are made larger than the conventional dimensions by being set to, for example, 0.7 mm to 1.2 mm. Since the arrangements other than those described above and the procedure of fixing the half mirror HM are substantially the same as those of the first embodiment shown in FIGS. 1 to 3, identical portions will be denoted by the same reference numerals, and a description thereof will be omitted.

According to the above-described structure, the ultraviolet curing adhesive agent 10 is injected smoothly from the outwardly expanded opening portion 7a up to the depth portion 7b along the inclined side surface 12 of the U-groove 7 without overflowing to the outside. Although the opening portion 7a of the U-groove 7 is expanded, the overall volume of the U-groove 7 is not much different from the volume of the conventional U-groove. Thus, the adhesive agent 10 in an appropriate quantity is accumulated in the U-groove 7, and the half mirror HM is reliably fixed at a predetermined position.

Figure 6:
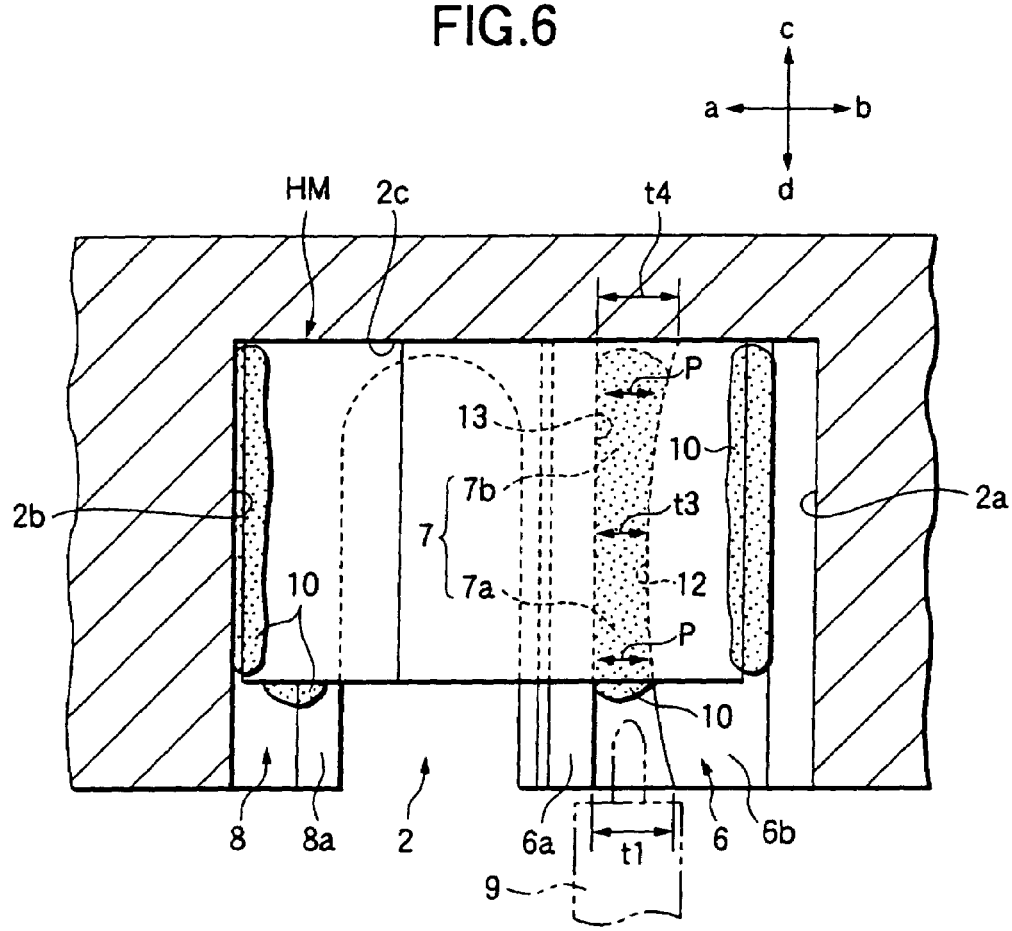
FIG. 6 is a horizontal sectional view of an apparatus for fixing a half mirror of an optical pickup in accordance with a third embodiment of the invention.
Figure 7:
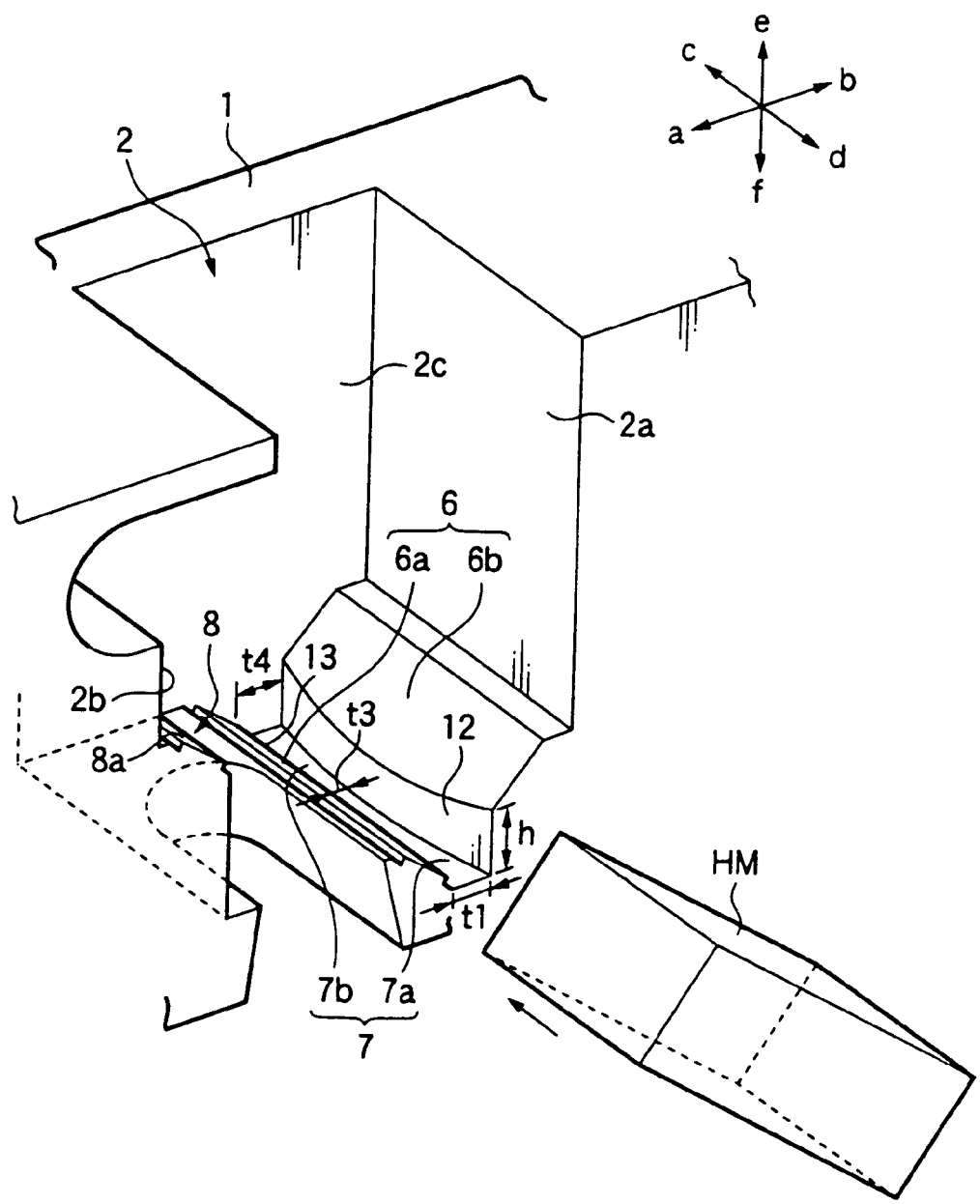
FIG. 7 is an exploded perspective view of the third embodiment.
Figure 8:
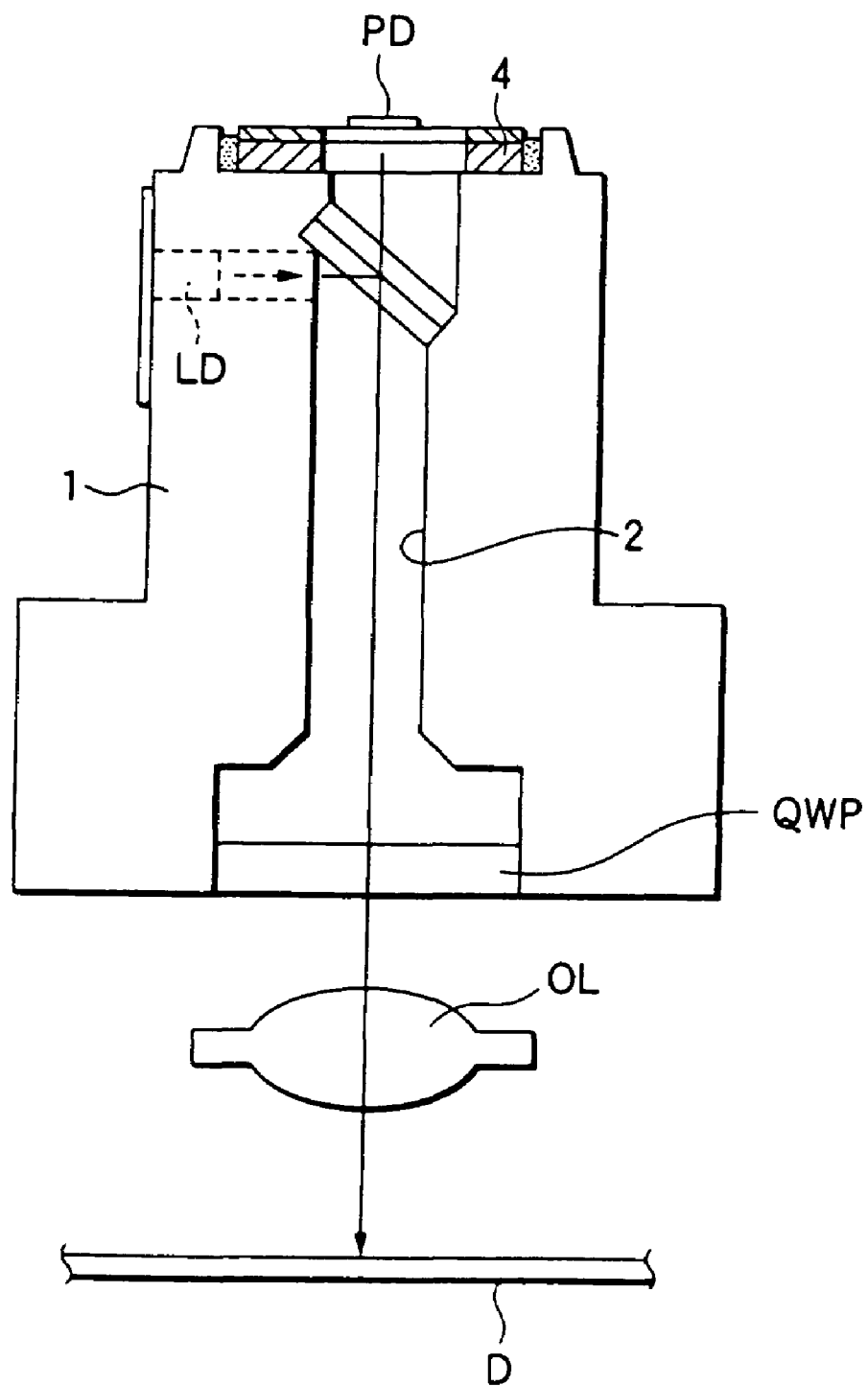
FIG. 8 is a schematic vertical sectional view of an optical pickup.

FIGS. 6 and 7 show an apparatus for fixing a half mirror of an optical pickup in accordance with a third embodiment of the invention. A U-groove 7 is defined between side surfaces 12 and 13. The side surface 13 is formed linearly in the conventional manner. The side surface 12 is formed in an arcuate manner, such that the width t3 of the central portion of the U-groove 7 is set to be narrow while the widths t1 and t4 of the opening end and the depth end of the U-groove 7 are respectively set to be wide. Since the arrangements other than those described above and the procedure of fixing the half mirror HM are substantially the same as those of the first embodiment shown in FIGS. 1 to 3, identical portions will be denoted by the same reference numerals, and a description thereof will be omitted.

According to the above-described structure, since the width t1 of the opening end of the U-groove 7 is set to be wide, the ultraviolet curing adhesive agent 10 is injected smoothly from the widely set opening portion 7a up to the depth portion 7b along the arcuate side surface 12 of the U-groove 7 without overflowing to the outside. In addition, the width t3 of the central portion of the U-groove 7 is set to be narrow, while the widths t1 and t4 of the opening end and the depth end of the U-groove 7 are respectively set to be wide. Therefore, since the overall volume of the U-groove 7 is not much different from the volume of the conventional U-groove, the adhesive agent 10 in an appropriate quantity is accumulated in the U-groove 7. Also, the adhesive agent 10 is injected symmetrically in the U-groove 7 with its central portion serving as a boundary, and the arrangement provided is such that the shrinkage force P at the time when the adhesive agent 10 is solidified is applied substantially uniformly to the half mirror HM. Therefore, the half mirror HM is reliably fixed at a predetermined position.

Table 1 shows an experimental result, which compares a conventional art and an embodiment of the invention (the first embodiment). As can be seen from Table 1, it took 2 seconds for fixing work in the conventional art, while it took only 0.3 seconds for fixing work in the embodiment.

TABLE 1

| | Injecting needle | Pressure (MPa) | Time (sec) | Injecting number | work time (sec) |
|---|---|---|---|---|---|
| Conventional art | 22G | 0.45 | 0.4 | 5 injections | 2 |
| Embodiment of invention | 18G | 0.5 | 0.3 | 1 injection | 0.3 |

As above described, according to the first aspect of the invention, the width of the opening end of the groove is set to be wide, and the adhesive agent in a quantity substantially corresponding to the volume of the groove is injected into the groove. Thus, the adhesive agent is injected smoothly up to the depth portion along the arcuate side surface of the groove without overflowing to the outside. In addition, the width of the central portion of the groove is set to be narrow, while the widths of the opening end and the depth end of the groove are respectively set to be wide. Therefore, since the overall volume of the groove is not much different from the volume of the conventional groove, the adhesive agent in an appropriate quantity is accumulated in the groove. Also, since the adhesive agent is injected symmetrically in the groove with its central portion serving as a boundary, the shrinkage force at the time when the adhesive agent is solidified is applied substantially uniformly to the half mirror, thereby making it possible to reliably fix the half mirror at a predetermined position.

According to the second aspect of the invention, since the opening portion of the groove is outwardly expanded, the adhesive agent is injected smoothly from the expanded opening portion up to the depth portion of the groove without overflowing to the outside. In addition, the opening portion of the groove is expanded and the overall volume of the groove is not much different from the volume of the conventional groove. Thus, the adhesive agent in an appropriate quantity is accumulated in that groove, and the half mirror is reliably fixed at a predetermined position.

According to the third aspect of the invention, since the side surface portion of the one side surface opposing the opening portion of the groove is laterally wider than the side surface portion thereof opposing the inner portion of the groove, the adhesive agent is injected smoothly from the expanded opening portion up to the depth portion of the groove without overflowing to the outside. In addition, since the opening portion of the groove is merely expanded, and the overall volume of the groove is not much different from the volume of the conventional groove, the adhesive agent in an appropriate quantity is accumulated in that groove, and the half mirror is reliably fixed at a predetermined position.

According to the fourth aspect of the invention, at least one side surface of the groove is inclined in an outwardly expanding manner. Thus, the adhesive agent is injected smoothly from that outwardly expanded opening portion up to the depth portion of the groove along the inclined side surface without overflowing to the outside. In addition, although the opening portion of the groove is expanded, the overall volume of the groove is not much different from the volume of the conventional groove, so that the adhesive agent in an appropriate quantity is accumulated in that groove only, and the half mirror is reliably fixed at a predetermined position.

According to the fifth aspect of the invention, since the width of the opening end of the groove is set to be wide, the adhesive agent is injected smoothly from that widely set opening portion up to the depth portion along the arcuate side surface of the groove without overflowing to the outside. In addition, the width of the central portion of the groove is set to be narrow, while the widths of the opening end and the depth end of the groove are respectively set to be wide. Therefore, since the overall volume of the groove is not much different from the volume of the conventional groove, the adhesive agent in an appropriate quantity is accumulated in the groove. Also, since the adhesive agent is injected symmetrically in the groove with its central portion serving as a boundary, and the shrinkage force at the time when the adhesive agent is solidified is applied substantially uniformly to the half mirror, it is possible to reliably fix the half mirror at a predetermined position.

What is claimed is:

1. An apparatus for fixing a half mirror of an optical pickup, comprising:
    a retaining seat having an inclined side surface and an inclined end surface which are orthogonal to each other, the retaining seat is formed on one side surface of a light passage hole formed in a housing;
    a groove formed between the inclined side surface and the inclined end surface; and
    a positioning seat having an inclined side surface flush with the inclined side surface of the retaining seat, the positioning seat is formed on another side surface of the light passage hole,
    wherein both end portions of the half mirror are disposed on the retaining seat and the positioning seat respectively whereby the half mirror is positioned in an inclined state,
    wherein an adhesive agent is injected between each of the both end portions of the half mirror and each of the seats and into the groove, and
    wherein one side surface of the groove is formed in an arcuate shape whereby a width of a central portion of the groove is narrow and widths of both ends of the groove are wide.

2. An apparatus for fixing a half mirror of an optical pickup, comprising:
    a retaining seat having an inclined side surface and an inclined end surface which are orthogonal to each other, the retaining seat is formed on one side surface of a light passage hole formed in a housing;
    a groove formed between the inclined side surface and the inclined end surface; and
    a positioning seat having an inclined side surface flush with the inclined side surface of the retaining seat, the positioning seat is formed on another side surface of the light passage hole,
    wherein both end portions of the half mirror are disposed on the retaining seat and the positioning seat respectively whereby the half mirror is positioned in an inclined state,
    wherein an adhesive agent is injected between each of the both end portions of the half mirror and each of the seats and into the groove,
    wherein one end in a longitudinal direction of the groove from which the adhesive agent is injected has an expanded width, and
    wherein at least one side surface of the groove is formed in an arcuate shape whereby a width of a central portion of the groove is narrow and widths of both ends of the groove are wide.

3. An apparatus for fixing a half mirror of an optical pickup according to claim 2, wherein one end of the groove has a greater width than the other end of the groove.

4. An apparatus for fixing a half mirror of an optical pickup according to claim 2, wherein the side surface of the groove opposite to the side surface formed in an arcuate shape is inclined with respect to a direction along which the groove extend so as to expand the width of the groove.

5. An optical pickup comprising:
    a housing having a light passage hole;
    a retaining seat having an inclined side surface and an inclined end surface which are orthogonal to each other, the retaining seat is formed on one side surface of the light passage hole;
    a groove formed between the inclined side surface and the inclined end surface;
    a positioning seat having an inclined side surface flush with the inclined side surface of the retaining seat, the positioning seat is formed on another side surface of the light passage hole; and
    a half mirror,
    wherein both end portions of the half mirror are disposed on the retaining seat and the positioning seat respectively whereby the half mirror is positioned in an inclined state,
    wherein an adhesive agent is injected between each of the both end portions of the half mirror and each of the seats and into the groove,
    wherein one end in a longitudinal direction of the groove from which the adhesive agent is injected has an expanded width, and
    wherein at least one side surface of the groove is formed in an arcuate shape whereby a width of a central portion of the groove is narrow and the width of each end of the groove is wider than the central portion of the groove.

* * * * *